(12) United States Patent
Follis et al.

(10) Patent No.: US 11,991,995 B2
(45) Date of Patent: May 28, 2024

(54) ILLUMINATING FISHING ROD

(71) Applicants: Derrick Follis, Virginia Beach, VA (US); Ashlee Shoup, Virginia Beach, VA (US)

(72) Inventors: Derrick Follis, Virginia Beach, VA (US); Ashlee Shoup, Virginia Beach, VA (US)

( * ) Notice: Subject to any disclaimer, the term of this patent is extended or adjusted under 35 U.S.C. 154(b) by 0 days.

(21) Appl. No.: 17/840,380

(22) Filed: Jun. 14, 2022

(65) Prior Publication Data
US 2023/0397589 A1 Dec. 14, 2023

(51) Int. Cl.
*A01K 87/00* (2006.01)
(52) U.S. Cl.
CPC .................... *A01K 87/007* (2013.01)
(58) Field of Classification Search
CPC ........... A01K 87/007; F21L 4/027; F21L 4/00
See application file for complete search history.

(56) References Cited

U.S. PATENT DOCUMENTS

| | | | | |
|---|---|---|---|---|
| 2015/0116992 A1* | 4/2015 | Massey | .................. | A01K 97/12 |
| 2015/0276189 A1* | 10/2015 | Palfreyman | ............. | F21V 21/14 |
| 2017/0038016 A1* | 2/2017 | Vermillion | ................ | F21L 4/02 |
| 2018/0295829 A1* | 10/2018 | Blackadar | .............. | A01K 97/12 |
| 2023/0204168 A1* | 6/2023 | Bertken | .................... | F21L 4/02 |

\* cited by examiner

*Primary Examiner* — Joshua J Michener
*Assistant Examiner* — Henry Hooper Mudd
(74) *Attorney, Agent, or Firm* — The Iwashko Law Firm, PLLC; Lev Ivan Gabriel Iwashko

(57) ABSTRACT

An illuminating fishing rod, including a main body to facilitate fishing, an illumination unit disposed on at least a portion of the main body to illuminate a surrounding area thereof, and a power button disposed on at least a portion of the main body to turn on the illumination unit in response to depressing the power button a first time, and turn off the illumination unit in response to depressing the power button a second time.

2 Claims, 1 Drawing Sheet

ILLUMINATING FISHING ROD

BACKGROUND

1. Field

The present general inventive concept relates generally to a fishing rod, and particularly, to an illuminating fishing rod.

2. Description of the Related Art

Fishing is a popular pastime that requires patience and awareness of surroundings. However, fishing at night and/or a low light environment can make it difficult to catch a fish. Also, attempting to obtain lures, hooks, and/or knives in the dark is dangerous and will likely lead to a serious injury.

A conventional fishing rod lacks any source of illumination. Thus, people interested in fishing have to resort to fishing during the daytime and/or using an external light source, which is not always practical. The external light source is either limited in direction of use and/or could not be held simultaneously during fishing.

Therefore, there is a need for an illuminating fishing rod that illuminates any surrounding area to improve visibility at night and/or a low light environment.

SUMMARY

The present general inventive concept provides an illuminating fishing rod.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an illuminating fishing rod, including a main body to facilitate fishing, an illumination unit disposed on at least a portion of the main body to illuminate a surrounding area thereof, and a power button disposed on at least a portion of the main body to turn on the illumination unit in response to depressing the power button a first time, and turn off the illumination unit in response to depressing the power button a second time.

The illumination unit may include a light to emit at least one beam of light, and a circuit board connected to the light to adjust a color of the at least one beam of light.

The circuit board may automatically adjust a spectrum of the at least one beam of light from visible light to at least one of UV light and IR light in response to an amount of light in an environment detected thereon.

The illuminating fishing rod may further include a control unit disposed within at least a portion of the main body to automatically turn on the illumination unit in response to detecting at least one of an amount of light in an environment and movement of the main body corresponding to fishing.

The illuminating fishing rod may further include a charging port disposed on at least a portion of the main body to send power to an external device connected therein.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Illuminating Fishing Rod 100
Main Body 110

Pole 111
Guides 112
Handle 113
Power Source Cover 114
Illumination Unit 120
Light 121
Circuit Board 122
Power Button 130
Wire 140
Control Unit 150
Power Source 160
Charging Port 170

Figure 1:
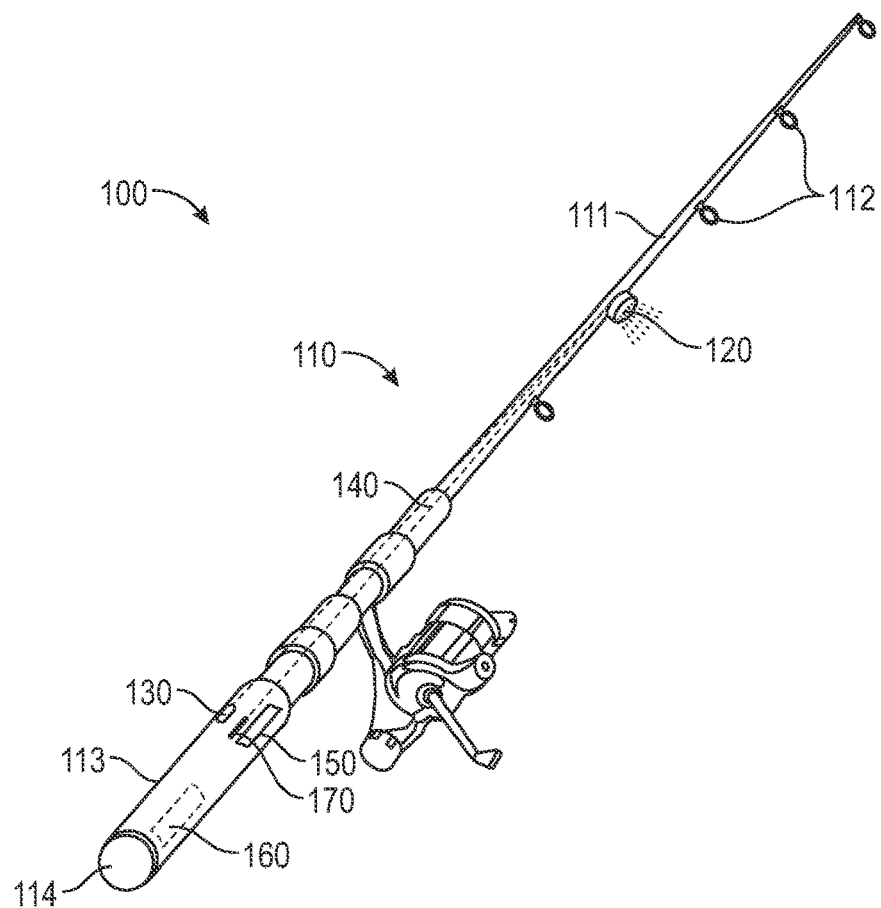
FIG. 1 illustrates a side perspective view of an illuminating fishing rod, according to an exemplary embodiment of the present general inventive concept.

FIG. 1 illustrates a side perspective view of an illuminating fishing rod 100, according to an exemplary embodiment of the present general inventive concept.

The illuminating fishing rod 100 may be constructed from at least one of metal, plastic, wood, glass, and rubber, etc., but is not limited thereto.

The illuminating fishing rod 100 may include a main body 110, an illumination unit 120, a power button 130, a wire 140, a control unit 150, a power source 160, and a charging port 170, but is not limited thereto.

Referring to FIG. 1, the main body 110 is illustrated to have a spinning reel (a.k.a., open face reel) design. However, the main body 110 may be a spincast reel (a.k.a., closed face reel), a bait casting reel, a fly reel, a centerpin reel, or any other type of reel and/or rod known to one of ordinary skill in the art, but is not limited thereto.

The main body 110 may include a pole 111, a plurality of guides 112, a handle 113, and a power source cover 114, but is not limited thereto.

The pole 111 (a.k.a., butt) may have an elongate shape and/or facilitate fishing. Moreover, the pole 111 may at least partially deform (e.g., bend) in response to an application of force (e.g., pushing, pull) thereto. In other words, the pole 111 may bend during fishing in response to movement of a fish connecting to a fishing line on the pole 111.

The plurality of guides 112 may be disposed on at least a portion of the pole 111. Additionally, each of the plurality of guides 112 may be distanced from each other along a length of the pole 111. The plurality of guides 112 may receive the fishing line therein and facilitate movement of the fishing line along at least a portion of an entire length of the pole 111.

The handle 113 may be disposed on at least a portion of an end of the pole 111. The handle 113 may facilitate gripping thereof.

The power source cover 114 may be disposed on at least a portion of the handle 113. The power source cover 114 may facilitate access within the handle 113 in response to being opened. Conversely, the power source cover 114 may prevent access within the handle 113 in response to being closed.

Figure 2:
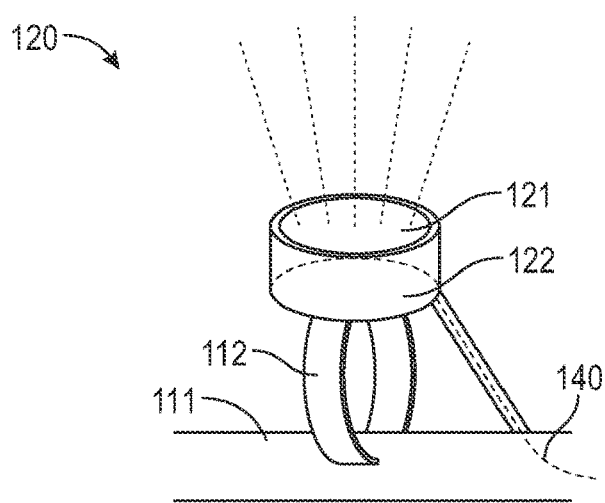
FIG. 2 illustrates a zoomed in view of an illumination unit, according to an exemplary embodiment of the present general inventive concept.

FIG. 2 illustrates a zoomed in view of an illumination unit 120, according to an exemplary embodiment of the present general inventive concept.

The illumination unit 120 may include a light 121 (e.g., an incandescent bulb, a light-emitting diode (LED), a halogen lamp, etc.) and a circuit board 122, but is not limited thereto.

The light 121 and/or the circuit board 122 may be disposed on at least a portion of the pole 111. Alternatively, referring to FIG. 2, the light 121 and/or the circuit board 122 may be disposed on at least one of the plurality of guides 112. The light 121 may illuminate a surrounding area thereof. For example, the light 121 may emit at least one beam of light in at least one direction. As such, the light 121 may increase visibility during night, dark, and/or low light conditions.

The circuit board 122 may include a processing unit (e.g., a processor, a central processing unit (CPU), a microcontroller, etc.) and a light sensor, but is not limited thereto.

The circuit board 122 may be part of a transistor. The circuit board 122 may be connected to the light 121 to adjust a color of the at least one beam of light from the light 121. Alternatively, the circuit board 122 may automatically adjust a spectrum of the light 121 based on an amount of light in an environment (e.g., dark, low light) detected thereon. For example, the circuit board 122 may automatically adjust the spectrum of light of the light 121 from visible light to ultraviolet rays (UV) and/or infrared rays (IR), such that UV light and/or the IR light may facilitate seeing certain types of fish.

The power button 130 may be disposed on at least a portion of the handle 113 and/or connected to the illumination unit 120. The light 121 may turn on in response to depressing the power button 130 a first time. Also, the light 121 may turn off in response to depress the power button 130 a second time. Furthermore, the light 121 may adjust in a brightness level in response to depressing the power button 130 for a predetermined period of time (e.g., two seconds, five seconds, ten seconds, etc.). For example, the light 121 may increase to 90,000 lumens in response to depressing the power button 130 for five seconds. Comparatively, initially turning the light 121 on may set the light 121 to a default 100 lumens.

The wire 140 may be disposed within at least a portion of the pole 111 and/or the handle 113. The wire 140 may connect the illumination unit 120 to the power button 130.

The control unit 150 may include a processing unit (e.g., a processor, a central processing unit (CPU), a microcontroller, etc.) and a sensor (e.g., light sensor, movement sensor), but is not limited thereto.

The control unit 150 may be disposed within at least a portion of the handle 113 and/or connected to the illumination unit 120. The control unit 150 may have a program running thereon to recognize movement of the pole 111 and/or the handle 113 during fishing by a user. The control unit 150 may automatically turn on the light 121 in response to detecting, via the sensor, the amount of light in the environment surrounding the control unit 150 and/or movement of the handle 113 corresponding to use of the handle 113 during fishing (e.g., rapid movement, jerking, reeling of fish).

The power source 160 may include a battery and a solar cell, but is not limited thereto.

The power source 160 may be removably disposed within at least a portion of the handle 113. The power source 160 may provide power to the illumination unit 120, the power button 130, and/or the control unit 150.

The charging port 170 may include a power outlet, such as a universal serial bus (USB) port and/or an electrical outlet (e.g., two-prong outlet, three-prong outlet, etc.).

The charging port 170 may be disposed on at least a portion of the handle 113. The charging port 170 may receive a connection from an external device (e.g., a mobile device, a phone, a tablet) using a cord to charge and/or power the external device.

Therefore, the illuminating fishing rod 100 may improve visibility while fishing during night time and/or low light conditions. Also, the illuminating fishing rod 100 may prevent injuries while attempting to retrieve fishing equipment.

The present general inventive concept may include an illuminating fishing rod 100, including a main body 110 to facilitate fishing, an illumination unit 120 disposed on at least a portion of the main body 110 to illuminate a surrounding area thereof, and a power button 130 disposed on at least a portion of the main body 110 to turn on the illumination unit 120 in response to depressing the power button 130 a first time, and turn off the illumination unit 120 in response to depressing the power button 130 a second time.

The illumination unit 120 may include a light 121 to emit at least one beam of light, and a circuit board 122 connected to the light 121 to adjust a color of the at least one beam of light.

The circuit board 122 may automatically adjust a spectrum of the at least one beam of light from visible light to at least one of UV light and IR light in response to an amount of light in an environment detected thereon.

The illuminating fishing rod 100 may further include a control unit 150 disposed within at least a portion of the main body 110 to automatically turn on the illumination unit 120 in response to detecting at least one of an amount of light in an environment and movement of the main body 110 corresponding to fishing.

The illuminating fishing rod 100 may further include a charging port 170 disposed on at least a portion of the main body 110 to send power to an external device connected therein.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. An illuminating fishing rod, comprising:
   a main body to facilitate fishing;
   an illumination unit disposed on at least a portion of the main body to illuminate a surrounding area thereof, the illumination unit comprising:
   a light to emit at least one beam of light;
   a light sensor to detect an amount of light in the surrounding area;
   a motion sensor to detect a movement of the main body; and
   a circuit board connected to the light to adjust a color of the at least one beam of light, wherein the circuit board automatically adjusts a spectrum of the at least one beam of light from visible light to at least one of UV light and IR light in response to the amount of light detected by the light sensor;
   a control unit disposed within at least a portion of the main body to automatically turn on the illumination unit in response to the amount of light detected by the light sensor and the movement of the main body detected by the motion sensor;
   a power button disposed on at least a portion of the main body to turn on the illumination unit in response to depressing the power button a first time, and turn off the illumination unit in response to depressing the power button a second time;
   a power source to provide power to the illumination unit; and
   a power indicator to visually indicate a charging condition of the power source.

2. The illuminating fishing rod of claim 1, further comprising:
   a charging port disposed on at least a portion of the main body to send power to an external device connected therein.

* * * * *